(12) United States Patent
Rittweger (10) Patent No.: US 12,485,708 B2
(45) Date of Patent: Dec. 2, 2025

(54) PNEUMATIC VEHICLE TIRE (71) Applicant: Continental Reifen Deutschland GmbH, Hannover (DE)

(72) Inventor: Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/715,097

(22) PCT Filed: Dec. 2, 2022

(86) PCT No.: PCT/DE2022/200288
§ 371 (c)(1),
(2) Date: May 30, 2024

(87) PCT Pub. No.: WO2023/104259
PCT Pub. Date: Jun. 15, 2023

(65) Prior Publication Data
US 2025/0018748 A1    Jan. 16, 2025

(30) Foreign Application Priority Data

Dec. 6, 2021  (DE) ..................... 10 2021 213 826.8

(51) Int. Cl.
*B60C 13/00*   (2006.01)
(52) U.S. Cl.
CPC ................................. *B60C 13/001* (2013.01)
(58) Field of Classification Search
CPC .................................................. B60C 13/001
See application file for complete search history.

(56) References Cited

FOREIGN PATENT DOCUMENTS

| DE | 102015217487 A1 | 3/2017 | |
|---|---|---|---|
| DE | 102016218486 A1 | 3/2018 | |
| DE | 102016218487 A1 | 3/2018 | |
| DE | 102019207943 A1 | 12/2020 | |
| EP | 2502758 A1 | 9/2012 | |
| EP | 3722112 A1 | 10/2020 | |
| EP | 3808549 A1 | 4/2021 | |
| JP | 2016215693 A * | 12/2016 | ........... B60C 13/001 |

(Continued)

OTHER PUBLICATIONS

English machine translation of DE102016218487 (Year: 2018).*

(Continued)

*Primary Examiner* — Robert C Dye
(74) *Attorney, Agent, or Firm* — Richard A. Wolf; Gregory Adams (57) ABSTRACT

A vehicle tire having a sidewall with at least one sidewall decoration that extends at least over a circumferential portion of the sidewall and is made up of structured surface elements, smooth surface elements and base hatching that adjoins these surface elements and is made up of hatching ribs that extend without branching and intersecting, wherein the structured surface elements reproduce a copy or a shadow at least of partial regions of smooth surface elements, and the structured surface elements absorb light to a greater extent than the base hatching. The structured surface elements are each provided with an area-covering contrast structure with branched rib portions, wherein each branched rib portion has intersection points from which the rib portion respectively extends in at least three directions.

13 Claims, 4 Drawing Sheets

(56) References Cited

FOREIGN PATENT DOCUMENTS

JP          2016215694 A  * 12/2016
JP          2016215697 A  * 12/2016

OTHER PUBLICATIONS

English machine translation of JP2016215693 (Year: 2016).*
English machine translation of JP2016215697 (Year: 2016).*
English machine translation of JP2016215694 (Year: 2016).*
International Search Report and Written Opinion dated Mar. 6, 2023 of International Application PCT/DE2022/200288 on which this application is based.
EP Examination Report dated Jul. 22, 2025 of counterpart European Application No. 22 829 687.7.

* cited by examiner

Fig. 7: Section F

Fig. 8

PNEUMATIC VEHICLE TIRE

CROSS-REFERENCE TO RELATED APPLICATIONS

This application is a National Stage Application under 35 U.S.C. § 371 of International Patent Application No. PCT/DE2022/200288 filed on Dec. 2, 2022, which claims priority to German Application No 10 2021 213 826.8 filed on Dec. 6, 2021, the disclosures of which are herein incorporated by reference in their entireties.

TECHNICAL FIELD

The invention relates to a pneumatic vehicle tire having a sidewall with at least one sidewall decoration that extends at least over a circumferential portion of the sidewall and is made up of structured surface elements, smooth surface elements and base hatching that adjoins these surface elements and is made up of hatching ribs that extend without branching and intersecting, wherein the structured surface elements reproduce a copy or a shadow at least of partial regions of smooth surface elements, and the structured surface elements absorb light to a greater extent than the base hatching.

BACKGROUND

Such a pneumatic vehicle tire is known for example from DE 10 2015 217 487 A1. In that vehicle tire, the structured surface elements ("second structured surface elements") and the base hatching ("first structured surface elements") are constituent parts of polygonal decorative areas. The smooth surface elements form a reticular pattern with a multiplicity of mutually intersecting, elongate webs which delimit the decorative areas. The structured surface elements, which reproduce a copy or a shadow of the smooth surface elements, are located within the decorative areas and have a surface structure which is a surface roughness or consists of a multiplicity of punctiform three-dimensional elements or of a multiplicity of hatching ribs that extend parallel to one another. In the exemplary embodiments described, the base hatching is formed from hatching ribs that extend without branching and intersecting. The sidewall decoration creates a depth effect and is suitable for relatively large surface regions of sidewalls.

SUMMARY

In the sidewall decorations that are currently found on sidewalls of pneumatic vehicle tires, the three-dimensional effect (plastic effect) is limited. The perceivable three-dimensional effect is highly dependent on the manner of light incidence and the viewing angle, that is to say the position of the observer.

Therefore, the invention is based on the problem of providing, on a pneumatic vehicle tire of the type mentioned at the beginning, a large-area sidewall decoration that is at least largely independent of the manner of light incidence and the viewing angle and has a particularly pronounced three-dimensional effect.

The stated problem is solved according to the invention in that the structured surface elements are each provided with an area-covering contrast structure with branched rib portions, wherein each branched rib portion has intersection points from which the rib portion respectively extends in at least three directions.

Such rib portions give the structured surface elements light-reflection and light-absorption properties that are largely independent of direction, such that the surface elements are perceived as dark areas virtually without exception. The three-dimensional effect of the sidewall decoration is thus at least substantially independent of the manner of light incidence and the viewing angle, thereby allowing a large-area sidewall decoration having the desired light-reflection and light-absorption properties.

According to a preferred embodiment, each rib portion extends in exactly three directions from the intersection points. The rib portion therefore provides a multiplicity of rib flanks which extend in different directions and at which incident light from all possible directions is scattered, multiply reflected and absorbed, with the result that a particularly high contrast effect, independent of the viewing angle, is achieved. At all viewing angles, the structured surface elements therefore appear to be particularly dark and the sidewall decoration is particularly high-contrast. In addition, shadow effects arise which support clear accentuation of the sidewall decoration, particularly on the black rubber of the vehicle tire.

A further preferred embodiment is characterized in that the rib portions are elongate in one direction and extend parallel to one another in plan view with respect to their direction of longitudinal extension. Such rib portions are highly suitable for large-area sidewall decorations.

In the following text, preferred variants of the latter preferred embodiment that are combinable with one another will be discussed.

In a first preferred variant, each rib portion, as seen in plan view, is made up of alternately successive ribs that extend in a regular zigzag shape and of ribs that extend in a straight line and branch off therefrom. Such rib portions are likewise highly suitable for large-area sidewall decorations.

A second preferred variant, which is associated with the design of the base hatching, is characterized in that the hatching ribs of the base hatching have, at their base, a mutual first spacing and the rib portions extending parallel to one another have a mutual clear, second spacing from one another, wherein the first spacing is at least 150% of the second spacing. The rib portions of the contrast structure are therefore arranged "closer together" than the hatching ribs of the base hatching. As a result of the selected spacing, the light-absorption and light-reflection properties of the base hatching differ from those of the area-covering contrast structure, having the rib portions, of the structured surface elements, such that the three-dimensional effect of the sidewall decoration is emphasized particularly well.

A third preferred variant is characterized in that the hatching ribs of the base hatching have rib flanks that extend at a first angle relative to a perpendicular to the sidewall, wherein the rib portion has rib flanks that extend at a second angle relative to a perpendicular to the sidewall, wherein the first angle is at least 200%, preferably at least 250%, particularly preferably at least 300%, of the second angle. The "steep" rib flanks of the rip portion reflect much less light than the "shallow" rib flanks of the hatching ribs of the base hatching. This contributes to a further improvement in the contrast effect.

A further preferred embodiment, which represents an alternative to the abovementioned preferred embodiment with the elongate rib portions, is characterized in that each rib portion is a constituent part of an irregular hill and valley structure which is formed from the rib portion and closed-ended valleys adjoining the latter. The irregular hill and valley structure allows a particularly intense contrast effect that is independent of direction. The particularly intense contrast effect of this structure is also brought about by the fact that it can be formed in an at least substantially flawless state during vulcanization. A single, lasered, cohesive notch structure that forms the rib portion is formed on the inner side of the sidewall shell of the vulcanization mold. The corresponding rubber mixture can be molded particularly readily in such a notch structure during vulcanization, such that the notch structure is filled completely, or substantially completely, with rubber mixture. As a result, air inclusions are avoided and the vulcanization mold can be vented completely, or substantially completely, such that the irregular hill and valley structure is formed in a flawless state.

In a preferred variant of the latter preferred embodiment, the contrast structure is formed from joined-together contrast structure cells that have a matching shape in plan view and each have an irregular hill and valley structure, wherein the contrast structure has valleys defining the grid pattern along the mutual connection points of the contrast structure cells, wherein the irregular hill and valley structure extends as far as the valleys defining the grid pattern and the closed-ended valleys originate from the valleys defining the grid pattern. As a result of the repetition (replication) of such contrast structure cells, the contrast structure is scalable as desired in terms of size and is therefore highly suitable for surface regions of different sizes.

A further variant of the latter preferred embodiment is characterized in that the hatching ribs of the base hatching have rib flanks that extend at a first angle relative to a perpendicular to the sidewall, wherein the rib portion, which is a constituent part of an irregular hill and valley structure, has rib flanks that extend at a second angle to a perpendicular to the sidewall at a multiplicity of points, wherein the first angle is at least 200%, preferably at least 250%, particularly preferably at least 300%, of the second angle. The "steep" rib flanks of the rip portion reflect much less light than the "shallow" rib flanks of the hatching ribs of the base hatching. This contributes to a further improvement in the contrast effect.

According to a further preferred embodiment, the structured surface elements and the base hatching are each formed within polygonal decorative areas between which an at least partially irregular reticular pattern that is formed from the smooth surface elements and has elongate webs extends.

In the latter preferred embodiment, the polygonal decorative areas are each made up of a single structured surface element and a single- or multi-part surface element that forms a partial region of the base hatching.

A further preferred embodiment is characterized in that the structured surface elements are formed in a uniformly offset manner with respect to the smooth surface elements such that the shadows reproduced by the structured surface elements reflect a light source coming from a single direction.

According to a further preferred embodiment, the structured surface elements are decorative areas, in particular decorative areas with different shapes, wherein the region(s) of the sidewall decoration that is/are free of structured surface elements and of smooth surface elements is/are taken up by the base hatching.

In the latter preferred embodiment, it is advantageous when pairs made up in each case of a structured surface element and of a smooth surface element are provided, wherein the surface elements belonging to one pair are formed adjacently to one another, in particular formed in a manner adjoining one another, wherein the smooth surface element projects into the structured surface element such that the structured surface element appears to be a shadow offset into the background with respect to the smooth surface elements. This allows a particularly realistic three-dimensional effect of the sidewall decoration.

BRIEF DESCRIPTION OF THE DRAWINGS

Further features, advantages and details of the invention will now be described in more detail on the basis of the drawing, which schematically shows exemplary embodiments of the invention. In the drawing.

DETAILED DESCRIPTION

The invention is concerned with a sidewall decoration formed on the outer surface of a sidewall of a vehicle tire, in particular of a pneumatic vehicle tire.

The prescribed information, such as the tire size, the speed index, the manufacturer, the tire designation, the intended use (summer/winter tire) and the like, is usually given on the sidewall of vehicle tires. This information is usually located on smooth surface regions of the sidewalls. A certain amount of free area, on which a sidewall decoration can be formed, remains on the sidewalls.

Figure 1:
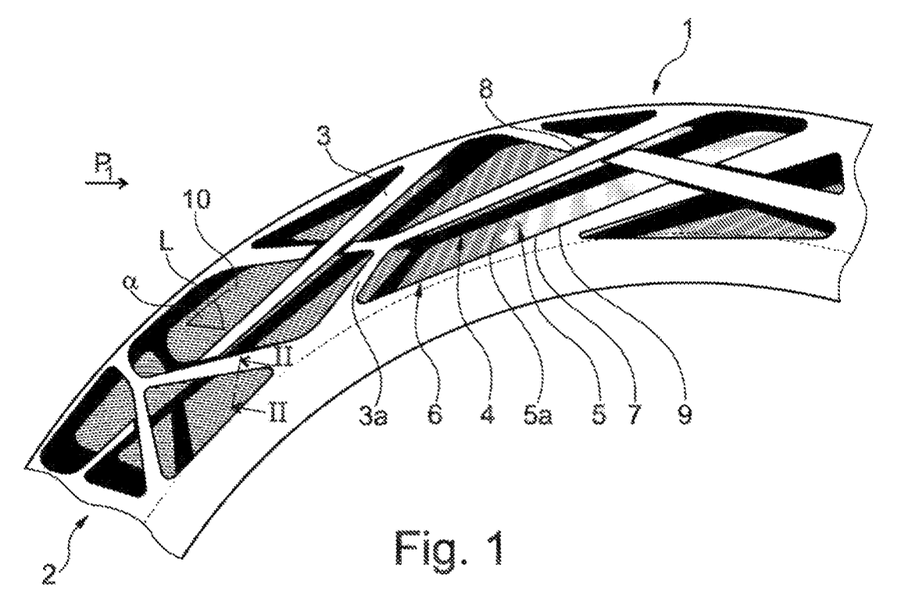
FIG. 1 shows a schematic view of a circumferential portion of a sidewall of a vehicle tire with a first embodiment variant of the invention.
Figure 8:
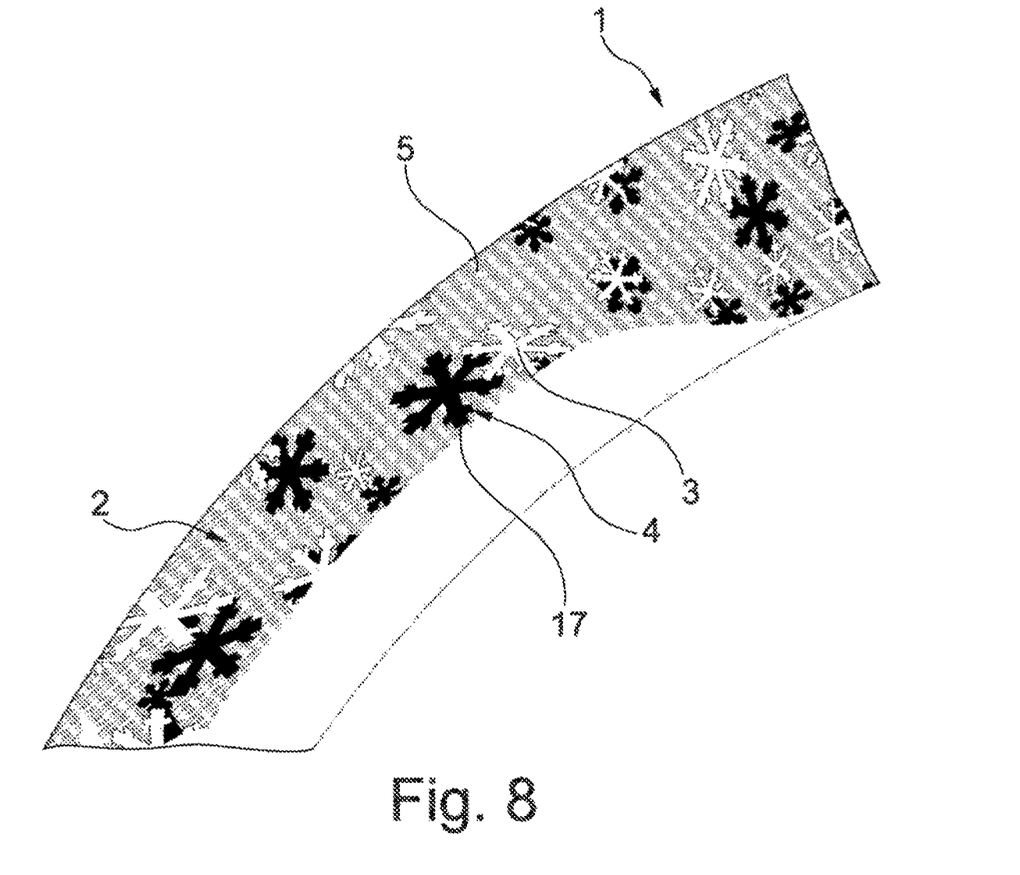
FIG. 8 shows a schematic view of a circumferential portion of a sidewall of a vehicle tire with a second embodiment variant of the invention.

FIG. 1 and FIG. 8 each show an illustration, projected onto a plane, of a circumferential portion of a sidewall 1. Formed on the sidewall 1 is a sidewall decoration 2, which extends at least over a circumferential portion of the sidewall 1. The sidewall decoration 2 comprises unstructured, smooth surface elements 3, surface-structured surface elements 4 with an area-covering contrast structure, and base hatching 5 adjoining the surface elements 3, 4. The structured surface elements 4 are embodied such that they absorb much more light than the base hatching 5 and therefore appear to be darker than the base hatching 5 when the sidewall 1 is viewed.

In the embodiment shown in FIG. 1, both the structured surface elements 4 and the base hatching 5 are constituent parts of polygonal, structured decorative areas 6 having rounded corners, in particular having three to five rounded corners. The decorative areas 6 are located in shallow depressions 7 (cf. FIG. 2), with respect to the smooth surface elements 3, that are formed in the sidewall 1. The depressions 7 and thus the decorative areas 6 are delimited, at the level of the smooth surface elements 3, by edges 9. The decorative areas 6 are each made up of a single one of the abovementioned structured surface elements 4 and of a single- or multipart, in particular two- or three-part, surface element 5a that forms a partial region of the base hatching 5. Between the decorative areas 6, it is possible for connecting depressions 8 that are up to 0.5 mm in width in plan view to extend, in which in particular the base hatching 5 is continued.

The smooth surface elements 3 form an at least partially irregular reticular pattern with a multiplicity of mutually intersecting, elongate webs 3a which delimit the decorative areas 6. Since the pattern formed is at least partially irregular, there are decorative areas 6 with different shapes.

The structured surface elements 4 of the decorative areas 6 reproduce a copy or a shadow of a partial region, adjoining the respective decorative area 6, of the reticular pattern formed by the smooth surface elements 3. The structured surface elements 4 are slightly offset in and transversely to the circumferential direction with respect to the "associated" partial region of the reticular pattern. The offset arises in particular such that a shadow formation is simulated, the basis of which is a light source coming from a particular direction (indicated by the arrow $P_1$). In the case of a "copy", the dimensions of the structured surface element 4 match the dimensions of the respective partial region of the reticular pattern. In the case of a "shadow", the shape of the structured surface element 4 is distorted with respect to the respective partial region of the reticular pattern, such that the size and dimensions accordingly differ.

Figure 2:
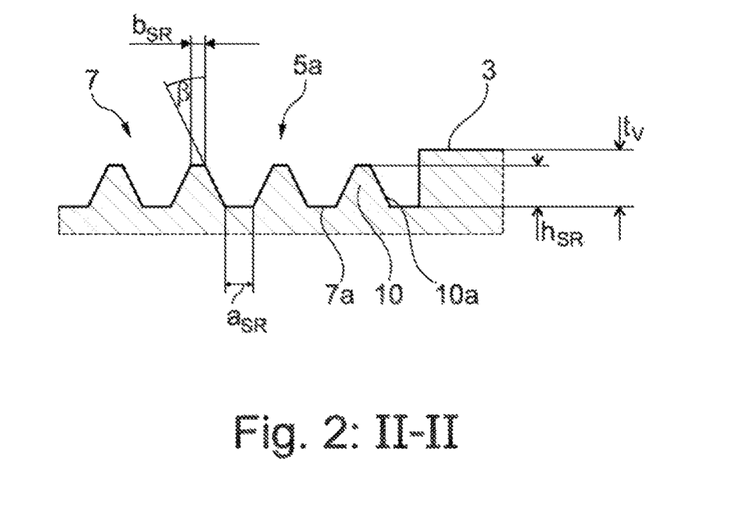
FIG. 2 shows an enlarged section along the line II-II in FIG. 1.

FIG. 2 shows a cross section in the region of the base hatching 5, that is to say in the region of a surface element 5a. The surface elements 5a are each formed from hatching ribs 10 that are located in the associated depression 7, extend without branching and intersecting and, according to FIG. 1, in the exemplary embodiment in plan view, extend in a straight line, parallel to one another and at an angle α of 30° to 50° to the circumferential direction. The angle α is determined with regard to a tangent applied locally to a line L that extends in an encircling manner in the circumferential direction. According to FIG. 2, the depression 7 has a constant depth $t_V$ measured perpendicularly to the level of the smooth surface elements 3 of 0.30 mm to 1.00 mm, in particular 0.40 mm to 0.50 mm, and a bottom 7a extending at the depth $t_V$. The hatching ribs 10 extend perpendicularly outward from the bottom 7a, have a height $h_{SR}$ of 0.15 mm to 0.35 mm, in particular 0.20 mm to 0.30 mm, and of at most 100% of the depth $t_V$ of the depression 7, and, as seen in cross section perpendicular to their direction of extension (cf. location of the line II-II in FIG. 1), have matching shapes, in the exemplary embodiment the shape of isosceles triangles with a flattened tip with a width $b_{SR}$ of preferably 0.07 mm to 0.12 mm. The hatching ribs 10 are each provided with two lateral rib flanks 10a, which, as seen in the abovementioned cross section, extend at uniformly large angles β of 15° to 45°, in particular at least 20°, preferably at least 30°, to the perpendicular to the sidewall 1. At their base at the bottom 7a, the hatching ribs 10 may directly adjoin one another, and in the embodiment shown they have, at their base, a mutual spacing $a_{SR}$ of 0.50 mm to 0.70 mm.

Figure 3:
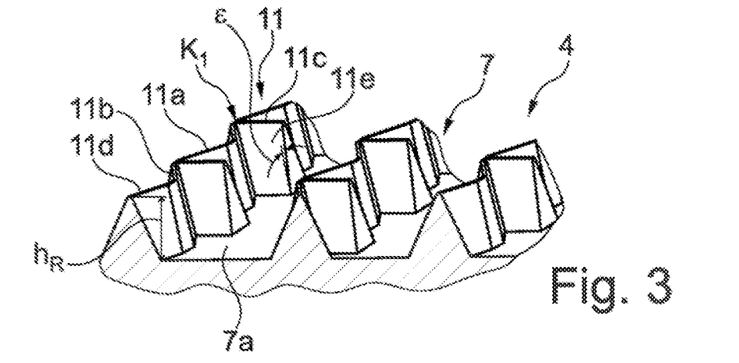
FIG. 3 shows an enlarged oblique view in the region of a structured surface element.
Figure 4:
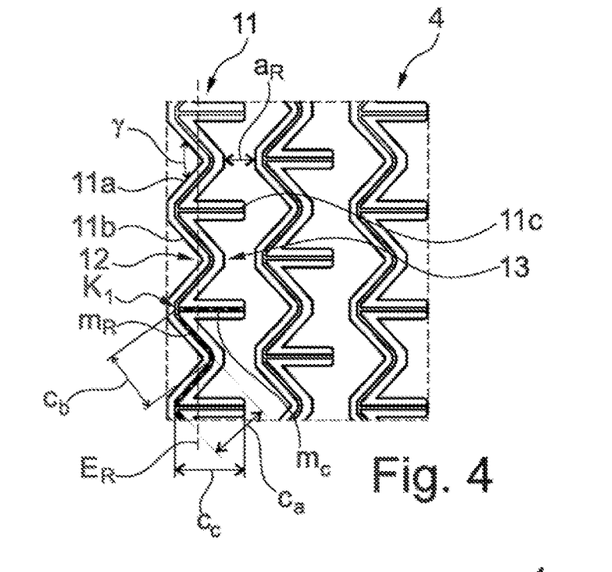
FIG. 4 shows a plan view in the region of the surface element in FIG. 3.
Figure 5:
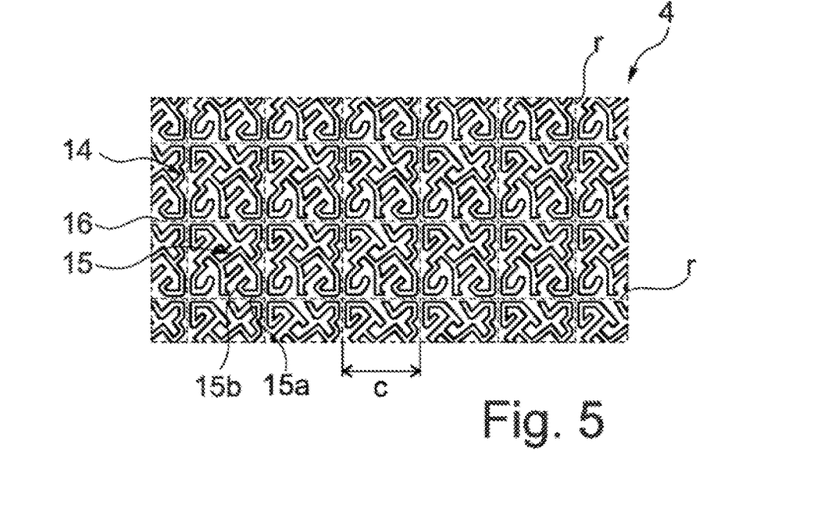
FIG. 5 shows an enlarged plan view in the region of a further structured surface element.

FIG. 3 and FIG. 4 show a partial region of a structured surface element 4 with an area-covering contrast structure according to a first variant, and FIG. 5 shows a partial region of a structured surface element 4 with an area-covering contrast structure according to a second variant.

In the variant shown in FIG. 3 and FIG. 4, the structured surface element 4 has a contrast structured made up of elongate, branched rib portions 11 that extend alongside one another and stand proud of the bottom 7a in the depression 7 (FIG. 3). Each rib portion 11 has a multiplicity of intersection points $K_1$, from which the rib portion 11 respectively extends in three directions. Each rib portion 11 is made up, in plan view, of alternately successive ribs 11a, 11b that extend in a regular zigzag shape and of lateral ribs 11c that extend in a straight line in plan view and branch off therefrom. According to FIG. 4, each rib portion 11 has a direction of longitudinal extension $E_R$ that follows its ribs 11a, 11b in plan view and, in the embodiment shown, is a straight line, wherein the rib portions 11 extend parallel to one another with regard to the direction of longitudinal extension $E_R$. The ribs 11a, 11b each have an extension length $c_a$ (rib 11a), $c_b$ (rib 11b) determined along their centerline $m_R$, wherein the extension lengths $c_a$, $c_b$ are each preferably identical to one another and are 0.20 mm to 0.40 mm, in particular 0.25 mm to 0.30 mm.

An inside corner region 12 and an outside corner region 13 is formed in each case between successive ribs 11a, 11b, wherein the ribs 11a, 11b each enclose an internal angle γ of 70° to 120° with one another at the inside corner regions 12.

In each case one of the lateral ribs 11c branches off from those inside corner regions 12 that are located on the same side of the successive ribs 11a, 11b, wherein the lateral ribs 11c each have an extension length $c_c$ determined along their centerline $m_c$ of 0.20 mm to 0.50 mm, preferably 0.25 mm to 0.40 mm.

The rib portions 11 that extend alongside one another within a structured surface element 4 are offset with respect to one another in their direction of longitudinal extension $E_R$ such that, in each case as seen transversely to the direction of longitudinal extension $E_R$, a rib 11a from one rib portion 11 extends next to a rib 11b from the adjacent rib portion 11 and such that the lateral ribs 11c are each directed in the direction of an inside corner region 12 of the adjacent rib portion 11. There is a mutual clear spacing $a_R$ of 0.20 mm to 0.40 mm between mutually facing outside corner regions 13 of adjacent rib portions 11.

According to FIG. 3, the ribs 11a, 11b, 11c have a substantially triangular cross section, a flattened saddle region 11d, and two rib flanks 11e that drop toward the bottom 7a of the depression 7 and each extend at an angle ε (indicated in FIG. 3) of 2° to 15°, in particular 10° to 12°, relative to a perpendicular to the bottom 7a. The rib portions 11 have a greatest height $h_R$ determined perpendicular to the bottom 7a of 0.25 mm to 0.35 mm, and of at most 100% of the depth $t_V$ (FIG. 2) of the depression 7. The abovementioned saddle region 11b may be in the form of a narrow plateau, with a width of 0.05 mm to 0.10 mm, that extends continuously over all the ribs 11a, 11b, 11c. In an alternative embodiment, the saddle region 11d is a rounded portion between the upper ends of the respective rib flanks 11e.

FIG. 5 shows a further variant of the contrast structure of a structured surface element 4, wherein a square grid with grid lines r is indicated. The contrast structure is made up of a multiplicity of substantially matching contrast structure cells 14, which, in the exemplary embodiment, are square with regard to their outer periphery in plan view and adjoin one another in a checkered manner, with an edge length c, with regard to the grid lines r, of 700.0 μm to 1200.0 μm. Each contrast structure cell 14 has an irregular hill and valley structure 15 (cf. FIG. 6), wherein the hill and valley structures 15—corresponding to the substantially matching contrast structure cells 14—are likewise embodied in a substantially matching manner.

"Substantially matching hill and valley structures 15" are understood to be, on the one hand, those which were created directly on the sidewall 1 by means of a software-controlled laser so as to "match". On the other hand, "substantially matching hill and valley structures 15" are understood to be those which were created during the vulcanization of a corresponding laser engraving located on the inner side of the side shell, wherein the laser engraving comprises a multiplicity of mutually adjoining engraving regions which were each created by means of a software-controlled laser so as to "match". On account of the melting and evaporation processes that occur during laser engraving, it is not possible to create identical (100% matching) hill and valley structures 15 on sidewalls with the currently available methods. "Substantially matching" therefore means deviations that arise within the technical tolerance limits of the production process (software-controlled laser engraving).

The contrast structure also has valleys 16 that extend along the grid lines r, intersect one another and form a lattice-like valley grid with one another, which is preferably identifiable with the naked eye.

The irregular hill and valley structure 15 of each contrast structure cell 14 is surrounded by the respective portions of the valleys 16, wherein, within each contrast structure cell 14, the partial regions, adjoining the respective grid lines r, of the corresponding four valleys 16 are located. The irregular hill and valley structure 15 is formed in an area-covering manner within the associated contrast structure cell 14 such that the hill and valley structure 15 extends as far as the partial regions of the respective four valleys 16 and therefore extensively adjoins these partial regions.

The arrangement of the contrast structure cells 14 and the configuration of the irregular hill and valley structures 15 are such that, as seen in plan view, the irregular hill and valley structures 15 are transferable into one another by (twist-free) parallel displacement.

Figure 6:
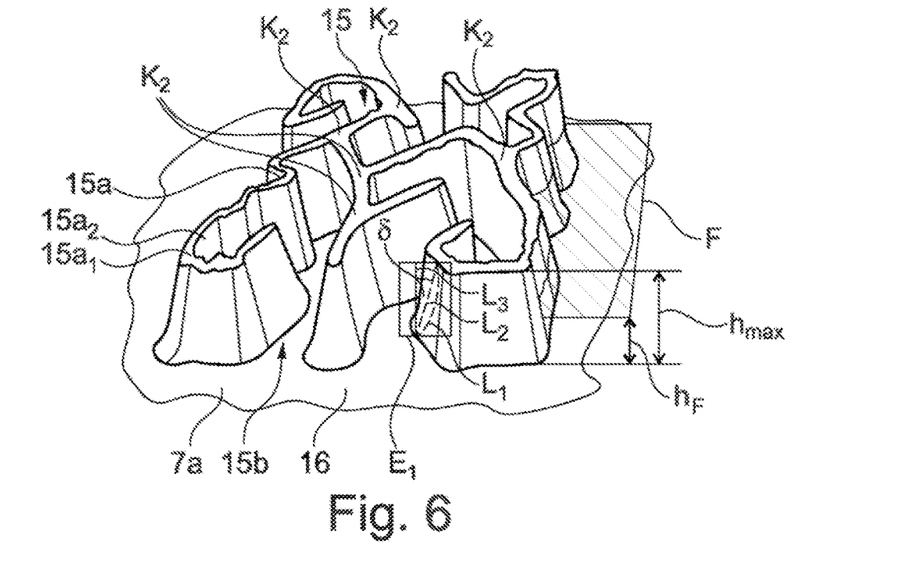
FIG. 6 shows a further enlarged oblique view of a contrast structure cell belonging to the surface element in FIG. 5.

FIG. 6 shows a schematic, simplified oblique view of an irregular hill and valley structure 15 illustrated in an idealized form. The hill and valley structure 15 is formed by a single, cohesive, irregular, multiply branched rib portion 15a and by a number of valleys 15b which originate from the valleys 16, surrounding the hill and valley structure 15, of the valley grid and end with closed ends in the "interior" of the rib portion 15a (cf. FIG. 5). The valleys 15b are thus in the form of "dead ends", and so there are no valley basins surrounded (enclosed) by portions of the rib portion 15a. As seen in plan view, the valleys 15b, starting from their end located at the respective valley 16, are irregularly elongate and optionally branched negatives (FIG. 5). Preferably, in each case at least one of the closed-ended valleys 15b originates from at least two, in particular at least three, of the four valleys 16.

The rib portion 15a has a number of intersection points $K_2$ that are T- or Y-shaped in plan view, wherein the intersection points $K_2$ are the only intersection points of the rib portion 15a and wherein in particular three to seven intersection points $K_2$ are provided. The rib portion 15a has a maximum height $h_{max}$ (height at the highest point(s)), determined with respect to and perpendicularly to the bottom 7a, of 0.25 mm to 0.35 mm.

The rib portion 15a also has a single saddle region 15a₁ and a number of irregularly curved rib flanks 15a₂, wherein the rib flanks 15a₂ originate from the saddle region 15a₁, extend as far as the bottom 7a and converge at the free ends of the rib portion 15a, surrounding the latter. A section plane $E_1$, perpendicular to the bottom 7a, in the region of a rib flank 15a₂ is indicated by way of example in FIG. 6. The section plane $E_1$ has a curved line of intersection $L_1$ with the relevant rib flank 15a₂. The rib flank 15a₂ extends in such a way that a straight auxiliary line $L_2$, connecting the ends of the line of intersection $L_1$, encloses an angle δ of 5° to 20° with a reference line $L_3$ that is perpendicular to the bottom 7a and intersects the auxiliary line $L_2$. In the region of the rib flanks 15a₂ it is possible for a multiplicity of section planes $E_1$ to be applied which result in an angle δ, defining the inclination of the rib flanks 15a2, of 5° to 20°.

Figure 7:
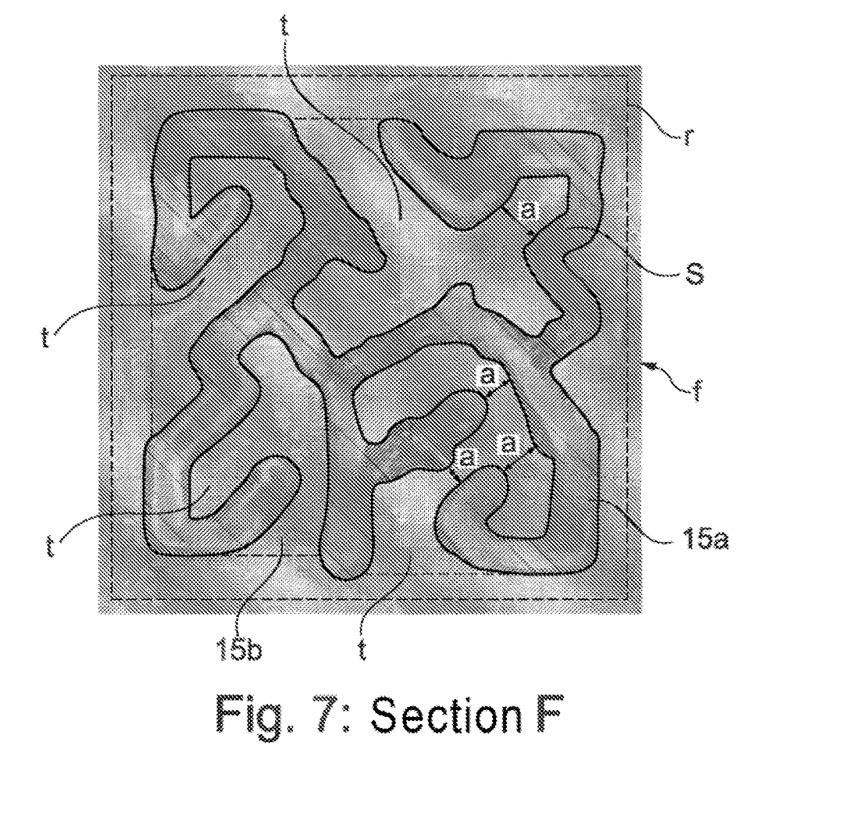
FIG. 7 shows a plan view of the contrast structure cell in FIG. 6, wherein a section along a height level F is shown.

A height level F extending parallel to the bottom 7a is indicated in FIG. 6. The height level F intersects the hill and valley structure 15 and extends at a height $h_F$, determined perpendicular to the bottom 7a, of 50% of the maximum height $h_{max}$. The height level F has, in each contrast structure cell 14, a height level region f (FIG. 7) delimited in plan view by the corresponding portions of the respective grid lines r. As FIG. 7 shows, the rib portion 15a has, with the height level region f, a one-piece (cohesive) section area s, which is hatched in FIG. 7. The section area s is thus a constituent part of the associated height level region f. In the region of the section area s, the rib portion 15a passes through the height level region f.

The section area s takes up 40% to 60% of the height level region f. Each closed-ended valley 15b has, in the height level region f, a valley area t adjoining the section area s. In the region of each valley area t, the rib portion 15a has a multiplicity of points at which the straight spacing a, determined as a minimum spacing, between mutually opposite parts of the rib portion 15a is 0.20 mm to 0.40 mm.

If the area-covering contrast structure according to the first variant is provided (FIG. 3, FIG. 4), the angle β (FIG. 2) at which the rib flanks 10a of the hatching ribs 10 of the base hatching 5 extend is at least 200%, preferably at least 250%, particularly preferably at least 300%, of the angle ε (FIG. 3) at which the rib flanks 11e of the rib portion 11 extend.

If the area-covering contrast structure according to the second variant is provided (FIG. 5, FIG. 6), the angle β (FIG. 2) at which the rib flanks 10a of the hatching ribs 10 of the base hatching 5 extend is at least 200%, preferably at least 250%, particularly preferably at least 300%, of the angle δ (FIG. 6) which characterizes the inclination of the rib flanks 15a2.

The spacing $a_{SR}$ (FIG. 2) which is present between the hatching ribs 10 of the base hatching 5 is at least 150% of the spacing $a_R$ (FIG. 4) which is present between the hatching ribs 11, or of the spacing a (FIG. 7) which is present in the region of the rib portion 15a.

In the embodiment shown in FIG. 8, the structured surface elements 4 are snowflake-like, structured decorative areas with different snowflake-like shapes, wherein the surface elements 4 are each located in depressions 17 that are formed in the sidewall 1 with respect to the level of the smooth surface elements 3 and are embodied analogously to the depressions 7 (FIG. 1, FIG. 2). The smooth surface elements 3 are snowflake-like, smooth decorative areas with different snowflake-like shapes, wherein these preferably each at least partially adjoin one of the surface elements 4. That region or those regions of the sidewall decoration 2 that is/are not provided with smooth surface elements 3 or surface elements 4 is/are taken up by the base hatching 5. The base hatching 5 thus adjoins the surface elements 3, 4, i.e. extends, in the region of the sidewall decoration 2, as far as the surface elements 3, 4. The base hatching 5 is embodied analogously to the embodiment variant in FIG. 1.

The majority of the surface elements 3, 4 are formed in pairs and in a manner offset with respect to one another such that the structured surface elements 4 each reproduce a shadow at least of a partial region of the associated surface element 3. The surface elements 3, 4 that belong to a pair are formed in a manner adjoining one another, wherein the snowflake shape of the smooth surface element 3 projects into the snowflake shape of the structured surface element 4, and "overlaps" the latter, such that the structured surface element 4 appears to be a shadow offset into the background with respect to the smooth surface elements 3.

The contrast structure of the structured surface elements 4 is embodied so as to match one of the variants as were explained in conjunction with FIG. 3 to FIG. 7.

The invention is not limited to the exemplary embodiments described.

In particular, the branched rib portions may extend from intersection points in more than three, in particular in four or five, directions.

LIST OF REFERENCE SIGNS

1 Sidewall
2 Sidewall decoration
3 Smooth surface element
3a Web
4 Structured surface element
5 Base hatching
5a Surface element
6 Decorative area
7 Depression
7a Bottom
8 Connecting depression
9 Edge
10 Hatching rib
10a Rib flank
11 Rib portion
11a, 11b Rib
11c Lateral rib
11d Saddle region
11e Rib flank
12 Inside corner region
13 Outside corner region
14 Contrast structure cell
15 Hill and valley structure
15a Rib portion
15a1 Saddle region
15a2 Rib flank
15b Valley
16 Valley
17 Depression
a, $a_E$, $a_R$, $a_{SR}$ Spacing
$b_E$, $b_{SR}$ Width
c Edge length
$c_a$, $c_b$, $c_c$ Extension length
$E_1$ Section plane
$E_R$ Direction of longitudinal extension
f Height level region
F Height level
$h_{SR}$, $h_R$, $h_F$ Height
$h_{max}$ Maximum height
$K_1$, $K_2$ Intersection point
L Line
$L_1$ Line of intersection
$L_2$ Auxiliary line
$L_3$ Reference line
$m_c$, $m_R$, $m_{ZR}$ Centerline
$P_1$ Arrow
r line
s Section area
t Valley area
$t_V$ Depth
α, β, δ, ε Angle
γ Internal angle

The invention claimed is:

1. A vehicle tire having a sidewall with at least one sidewall decoration that extends at least over a circumferential portion of the sidewall and is made up of structured surface elements, smooth surface elements, and base hatching that adjoins these surface elements and which is made up of hatching ribs that extend without branching and intersecting,
wherein the structured surface elements reproduce a copy or a shadow at least of partial regions of the smooth surface elements,
wherein the structured surface elements absorb light to a greater extent than the base hatching,
wherein the structured surface elements are each provided with an area-covering contrast structure with branched rib portions, wherein the branched rib portions intersect with each other at one or more intersection points from which the branched rib portions respectively extend in at least three directions,
wherein the branched rib portions together form an irregular and asymmetrical hill structure when viewed in plan view, with closed-ended valleys being formed between the respective branched rib portions,
wherein the irregular and asymmetrical hill structure and closed-ended valleys are contained within a contrast structure cell that is delineated by a peripheral valley that encloses the hill structure and the closed-ended valleys,
wherein the area-covering contrast structure includes a plurality of the contrast structure cells which are joined together to share their common peripheral valleys, the plurality of contrast structure cells being arranged in a two-dimensional grid pattern such that each cell is adjacent to neighboring cells in at least two non-parallel directions.

2. The vehicle tire as claimed in claim 1, wherein each contrast structure cell includes a plurality of intersection points, and the respective branched rib portions extend in exactly three directions from each of the plurality of intersection points.

3. The pneumatic vehicle tire as claimed in claim 1, wherein for each contrast structure cell, the closed-ended valleys open into the peripheral valley that delineates the contrast structure cell.

4. The pneumatic vehicle tire as claimed in claim 1, wherein the hatching ribs of the base hatching have rib flanks that extend at a first angle (β) relative to a perpendicular to the sidewall, wherein the branched rib portions have rib flanks that extend at a second angle (δ) to a perpendicular to the sidewall at a multiplicity of points, wherein the first angle (β) is at least 200% of the second angle (δ).

5. The pneumatic vehicle tire as claimed in claim 1, wherein the structured surface elements and the base hatching are each formed within polygonal decorative areas between which an at least partially irregular reticular pattern that is formed from the smooth surface elements and has elongate webs extends.

6. The pneumatic vehicle tire as claimed in claim 5, wherein the polygonal decorative areas are each made up of a single structured surface element and a single- or multi-part surface element that forms a partial region of the base hatching.

7. The pneumatic vehicle tire as claimed in claim 1, wherein the structured surface elements are formed in a uniformly offset manner with respect to the smooth surface elements such that the shadows reproduced by the structured surface elements reflect a light source coming from a single direction (arrow $P_1$).

8. The pneumatic vehicle tire as claimed in claim 1, wherein the structured surface elements are decorative areas with different shapes, wherein the region(s) of the sidewall decoration that is/are free of structured surface elements and of smooth surface elements is/are taken up by the base hatching.

9. The pneumatic vehicle tire as claimed in claim 8, wherein pairs made up in each case of a structured surface element and of a smooth surface element are provided, wherein the surface elements belonging to one pair are formed adjacently to one another, wherein the smooth surface element projects into the structured surface element such that the structured surface element appears to be a shadow offset into the background with respect to the smooth surface elements.

10. The pneumatic vehicle tire as claimed in claim 1, wherein each contrast structure cell includes a plurality of intersection points, with the respective branched rib portions extending in at least three directions from each of the plurality of intersection points, and wherein the irregular and asymmetrical hill structure, formed from the respective branched rib portions, is continuous without breaks between all of the plurality of intersection points.

11. The pneumatic vehicle tire as claimed in claim 1, wherein the irregular and asymmetrical hill structure, when viewed in plan view, is identical for each and every contrast structure cell of the area-covering contrast structure.

12. The pneumatic vehicle tire as claimed in claim 11, wherein the irregular and asymmetrical hill structure of each contrast structure cell, when viewed in plan view, is oriented in the same direction for each contrast structure cell, such that the contrast structure cells are repeated in the two-dimensional grid pattern without rotation.

13. The pneumatic vehicle tire as claimed in claim 12, wherein the two-dimension grid pattern is a rectilinear grid such that each contrast structure cell is directly adjacent to at least one other cell along both a first direction and a second direction that is orthogonal to the first direction, with adjacent cells sharing their common peripheral valleys along straight lines when viewed in plan view.

\* \* \* \* \*